(12) United States Patent
Tsuda

(10) Patent No.: US 7,756,376 B2
(45) Date of Patent: Jul. 13, 2010

(54) OPTICAL FUNCTIONAL WAVEGUIDE, OPTICAL MODULATOR, ARRAYED WAVEGUIDE GRATING, AND DISPERSION COMPENSATION CIRCUIT

(75) Inventor: Hiroyuki Tsuda, Yokohama (JP)

(73) Assignee: Keio University, Tokyo (JP)

( * ) Notice: Subject to any disclaimer, the term of this patent is extended or adjusted under 35 U.S.C. 154(b) by 36 days.

(21) Appl. No.: 10/573,888

(22) PCT Filed: Feb. 2, 2005

(86) PCT No.: PCT/JP2005/001460

§ 371 (c)(1),
(2), (4) Date: Nov. 13, 2006

(87) PCT Pub. No.: WO2005/083500

PCT Pub. Date: Sep. 9, 2005

(65) Prior Publication Data

US 2007/0211982 A1    Sep. 13, 2007

(30) Foreign Application Priority Data

Feb. 27, 2004    (JP)    ............... 2004-054903

(51) Int. Cl.
G02B 6/10 (2006.01)
G02B 6/12 (2006.01)
G02B 6/26 (2006.01)
G02F 1/01 (2006.01)
G02F 1/035 (2006.01)
G02F 1/295 (2006.01)

(52) U.S. Cl. ............... 385/129; 385/1; 385/2; 385/8; 385/14; 385/40; 385/50; 385/130; 385/131; 385/132

(58) Field of Classification Search ............ 385/2, 385/8, 14, 16, 129–132, 50, 1
See application file for complete search history.

(56) References Cited

U.S. PATENT DOCUMENTS 5,438,637 A * 8/1995 Nilsson et al. ............... 385/10

(Continued)

FOREIGN PATENT DOCUMENTS

CA    2315458    2/2001

(Continued)

OTHER PUBLICATIONS

The International Search Report for corresponding international patent application No. PCT/JP2005/001460. (Citing References AE-AI and BC-BI.).

(Continued)

Primary Examiner—Charlie Peng
Assistant Examiner—Hung Lam
(74) Attorney, Agent, or Firm—Edwards Angell Palmer & Dodge LLP

(57) ABSTRACT

An optical functional waveguide having a small size, used with stored energy, controlling the phase of light at high speed, and adjusting the optical path length. The optical functional waveguide includes a substrate (11), a quartz waveguide clad (12), a quartz waveguide core (13), groove structures (14), a filling material (15), and heater electrode (16). The filling material (15) placed in the groove structures (14) is, e.g., a resin transparent to the wavelength region of the guided light, and the refractive index temperature coefficient is about 10 to 100 times that of quartz. The heater electrode (16) is interposed between the groove structures (14) provided along the optical path. Therefore, the temperature of the filling material (15) can be varied sharply and quickly with little energy expended.

8 Claims, 15 Drawing Sheets

TOP VIEW

U.S. PATENT DOCUMENTS

| | | | |
|---|---|---|---|
| 5,502,590 A | 3/1996 | Suzuki et al. | |
| 6,122,419 A * | 9/2000 | Kurokawa et al. | 385/31 |
| 6,263,127 B1 * | 7/2001 | Dragone et al. | 385/24 |
| 6,373,872 B2 * | 4/2002 | Deacon | 372/34 |
| 6,459,533 B1 * | 10/2002 | Clapp et al. | 359/578 |
| 7,106,922 B2 * | 9/2006 | Liu | 385/15 |
| 2001/0009595 A1 | 7/2001 | Okuno et al. | |
| 2003/0059148 A1 | 3/2003 | Nishizawa et al. | |
| 2004/0001671 A1 | 1/2004 | Liu et al. | |
| 2004/0028367 A1 | 2/2004 | Nara et al. | |
| 2004/0033003 A1 | 2/2004 | Liu | |
| 2004/0126052 A1 * | 7/2004 | Kamei et al. | 385/14 |

FOREIGN PATENT DOCUMENTS

| | | |
|---|---|---|
| EP | 0818695 A | 1/1998 |
| EP | 1065534 A | 1/2001 |
| JP | 1-248141 | 10/1989 |
| JP | 5-289117 | 11/1993 |
| JP | 7-318994 | 12/1995 |
| JP | 9-152522 | 6/1997 |
| JP | 10-239645 | 9/1998 |
| JP | 11-167035 | 6/1999 |
| JP | 2000-029079 | 1/2000 |
| JP | 2001-116937 | 4/2001 |
| JP | 2001-272561 | 10/2001 |
| JP | 2003-084319 | 3/2003 |
| JP | 2003-98559 | 4/2003 |
| JP | 2003-167221 | 6/2003 |
| JP | 2003-279910 | 10/2003 |
| JP | 2004-045747 | 2/2004 |

OTHER PUBLICATIONS

Hashizume, Y., et al.; "Polymer-assisted silica-based thermo-optic switch;"Abstract from the Proceedings of the 2002 IEICE General Conference; C-3-10, p. 142, (Mar. 7, 2002). (Discussed in the Specification).

* cited by examiner

SECTIONAL VIEW

TOP VIEW

SECTIONAL VIEW

TOP VIEW

SECTIONAL VIEW

TOP VIEW

SECTIONAL VIEW

TOP VIEW

F I G. 5
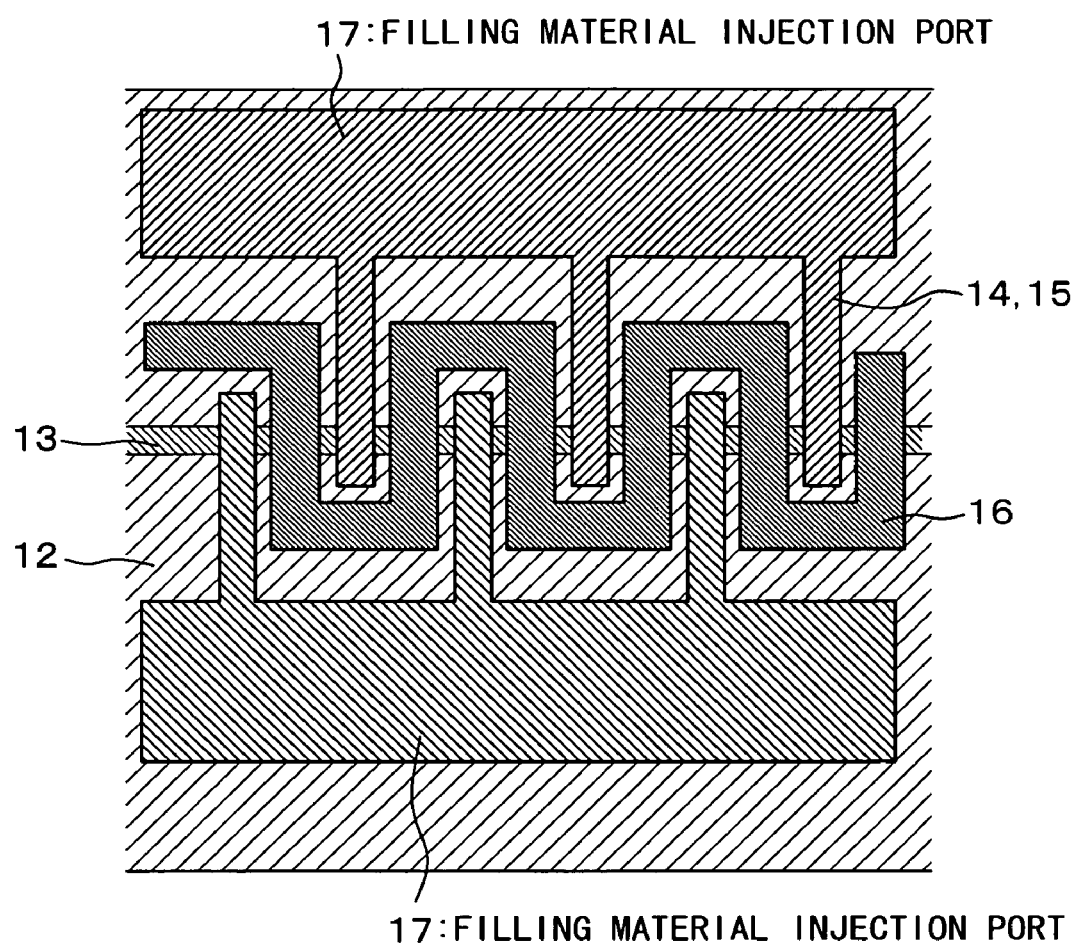

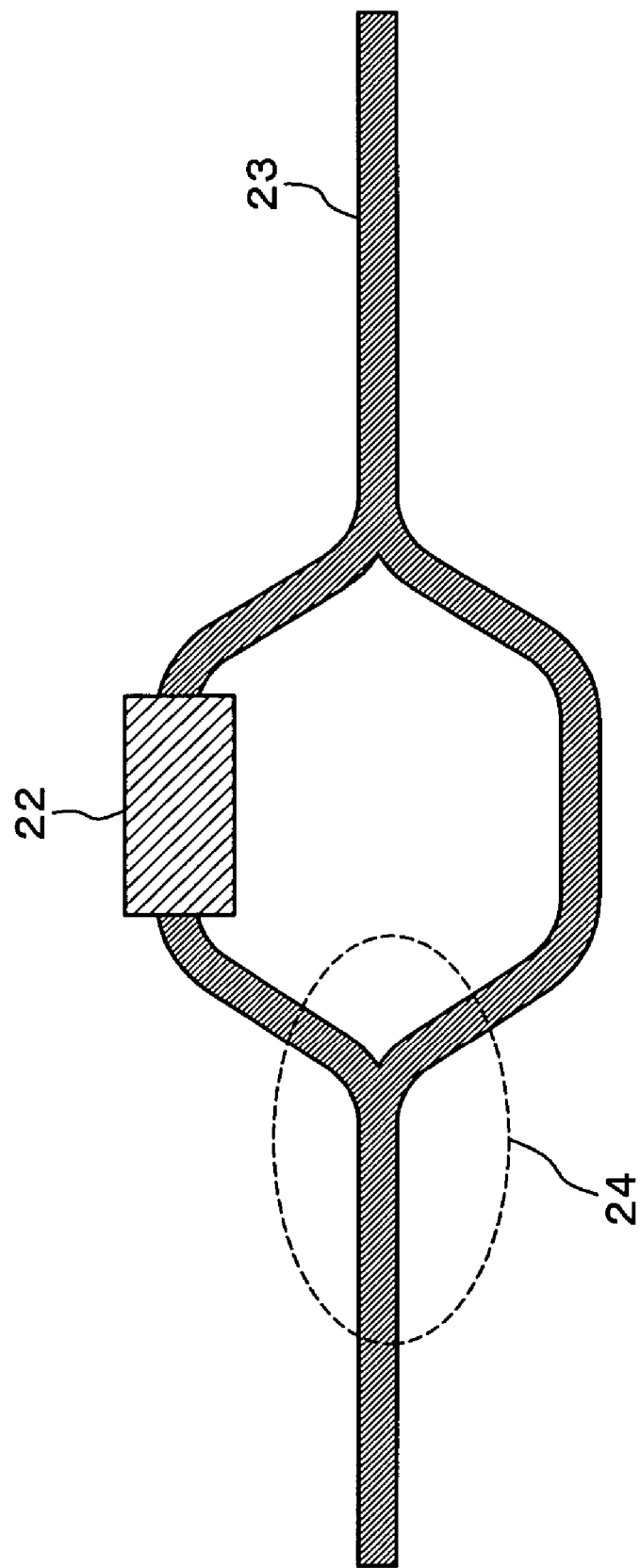

SECTIONAL VIEW

TOP VIEW

SECTIONAL VIEW

TOP VIEW

OPTICAL FUNCTIONAL WAVEGUIDE, OPTICAL MODULATOR, ARRAYED WAVEGUIDE GRATING, AND DISPERSION COMPENSATION CIRCUIT

BACKGROUND OF THE INVENTION

1. Field of the Invention

The present invention relates to an optical functional waveguide, an optical modulator, an arrayed waveguide grating and a dispersion compensation circuit having a small size, used with saved energy and capable of controlling the phase of light at high speed and of adjusting the optical path length or wavefront.

2. Description of the Related Art

A conventional quartz waveguide type optical modulator is constituted so as to include a phase modulating portion, which provides a heater in the vicinity of an optical waveguide and varies the refractive index of quartz by heating, in the interference system. Because a reflective index temperature coefficient of the quartz, $1.1 \times 10^{-5}[1/°C.]$, is low in this constitution, a waveguide length (heater length) of about $970\mu$ is required even if a temperature change of $50°C.$ is allowed in order to cause the phase change of $\pi$ in a communication wavelength of $1.55\mu$ band. A time required for the temperature change is several 10 ms, and energy required for the temperature rise becomes 100 mW or more. Thus, there remains an additional problem such as an increase in crosstalk by thermal interference between modulators and an enlargement of a cooling mechanism. Further, it is reported that power consumption of the modulator is reduced by filling of groove structures in the optical waveguide with a material having a large refractive index temperature coefficient with the conventional art. (For example, see Non-patent Reference 1)

Non-patent Reference 1: Yasuaki Hashizume, et al. "The Institute of Electronics, Information and Communication Engineers, General Conference, Lecture Papers, 2002," Mar. 7, 2002, C-3-10, P14

SUMMARY

However, because a heater portion position is away from the groove structure, the speed of the switching time is insufficient. Further, this structure is not applied to waveguide type lenses of which the focal length are variable and optical deflection type switches.

In view of the above problem, the present invention was made, and it is an object of the present invention to provide an optical functional waveguide, an optical modulator, an arrayed waveguide grating and a dispersion compensation circuit having a small size, used with saved energy, and capable of controlling the phase of light at high speed and of adjusting the optical path length.

An optical functional waveguide of the present invention includes: a substrate; a clad formed on the substrate; a core which is formed in the clad and serves as an optical path; a plurality of groove structures formed so as to align at a predetermined interval along the optical path and fragmentize the optical path and being filled with a material having a refractive index temperature coefficient different from that of the core; and a heater electrode interposed between the plurality of groove structures provided along the optical path.

An optical functional waveguide of the present invention includes: a substrate; a clad formed on the substrate; a core which is formed in the clad and serves as an optical path; a plurality of lens-shaped groove structures formed so as to align at a predetermined interval along the optical path and fragmentize the optical path and being filled with a material having a refractive index different from that of the core; and a heater electrode interposed between the plurality of groove structures provided along the optical path.

At least one of the end faces of the plurality of groove structures is tilted from a position perpendicular to the optical path so that an amount of reflected light coupled to a waveguide from a groove interface can be restrained.

An optical modulator of the present invention includes the optical functional waveguide and modulates the amplitude or phase of light.

An arrayed waveguide grating of the present invention includes the optical functional waveguide in a slab waveguide.

A dispersion compensation circuit of the present invention includes the optical functional waveguide in the vicinity of a coupling portion that the two arrayed waveguide gratings are coupled to each other in cascade.

A dispersion compensation circuit of the present invention includes a mirror provided in the waveguide and arranged in the vicinity of a spectrum plane and the optical functional waveguide arranged in the vicinity of the mirror.

An optical functional waveguide of the present invention includes: a substrate; a clad formed on the substrate; a core which is formed in the clad and serves as an optical path; and the plurality of groove structures formed so as to align at a predetermined interval along the optical path and fragmentize the optical path and being filled with a material having two or more refractive indexes different from each other, the indexes differing from that of the core.

The groove structures are provided at a slab waveguide side of coupling portions of the slab waveguide and single mode waveguides so that loss can be reduced.

An optical functional waveguide of the present invention includes: a substrate; a clad formed on the substrate; a core which is formed in the clad and serves as an optical path; a plurality of wedge-shaped groove structures formed so as to align at a predetermined interval along the optical path and fragmentize the optical path and being filled with a material having a refractive index different from that of the core; and a heater electrode interposed between the plurality of groove structures provided along the optical path.

EFFECT OF THE INVENTION

Effects of the present invention will be explained below.

As a first effect, an optical functional waveguide for high speed optical modulators, etc., having a small size and used with saved energy can be constituted. Meanwhile, crosstalk by thermal interference between modulators can be reduced and a cooling mechanism can be miniaturized, the crosstalk and the enlargement of the cooling mechanism being cited as an additional problem.

As a second effect, a waveguide type lens, of which the focal length is variable, can be realized by application to a lens-shaped groove structure and by temperature control, and various optical functional waveguides for dispersion compensation circuits, etc., can be realized.

As a third effect, the optical path length of a waveguide can be finely adjusted by control of the refractive index of a material placed in groove structures provided in the waveguide.

As a fourth effect, groove structures having lens operation are provided at a slab waveguide side of coupling portions of the slab waveguide and the arrayed single mode waveguides respectively so that coupling efficiency can be raised.

This description includes the contents of the specification and/or the drawings of Japanese Patent Application No. 2004-054903, which is the base of the priority of this application.

BRIEF DESCRIPTION OF THE DRAWINGS

FIG. 5 is a top view showing a constitution of an optical functional waveguide of a fifth embodiment of the present invention.

FIG. 7 is a view showing a constitution of an optical modulator of a seventh embodiment of the present invention.

DESCRIPTION OF THE REFERENCE SIGNS

Figure 1A:
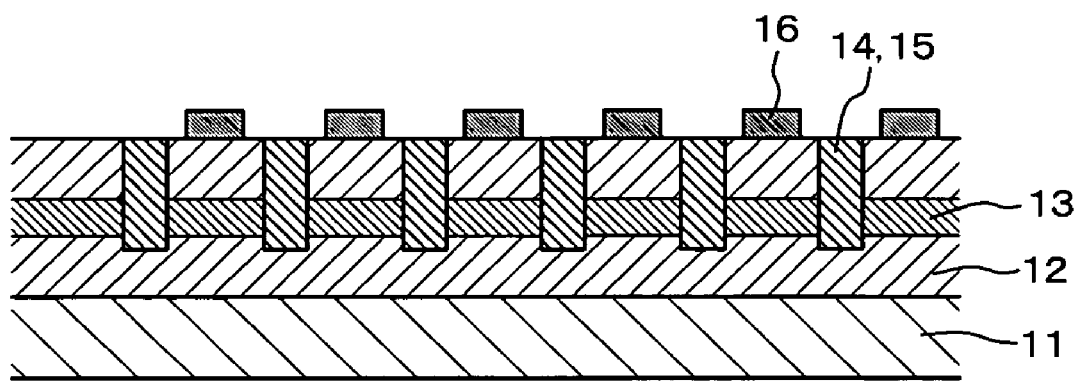
FIGS. 1A and 1B are views showing a constitution of an optical functional waveguide of a first embodiment of the present invention.

11 Substrate
12 Quartz waveguide clad
13 Quartz waveguide core
14 Groove structure
15 Filling material
16 Heater electrode
17 Filling material injection port
21 Directionality coupling portion
22 Phase modulation portion
23 Optical waveguide
24 Y branch
31 Groove structure
32 Filling material
33 Slab waveguide
33 Quartz slab waveguide
41 Groove structure
42 Filling material
51 Groove structure
52 Filling material
61 First arrayed waveguide grating
62 Slab waveguide
63 Arrayed waveguide
64 Slab waveguide
65 Second arrayed waveguide grating
66 Arrayed waveguide
67 Slab waveguide
68 Groove structure
69 Filling material
71 Arrayed waveguide grating
72 Slab waveguide
73 Arrayed waveguide
74 Slab waveguide
75 Mirror
76 Groove structure
77 Filling material
81 First groove structure
82 Second groove structure
83 Third groove structure
91 Single mode waveguide
92 Tapered waveguide
93 Slab waveguide
94 Groove structure
101 Single mode input waveguide
102 Tapered waveguide
103 Slab waveguide
104 Single mode output waveguide
105 Groove waveguide
106 Filling material Preferable embodiments of the present invention will be explained hereinafter with reference to the accompanying drawings.

Figure 1B:
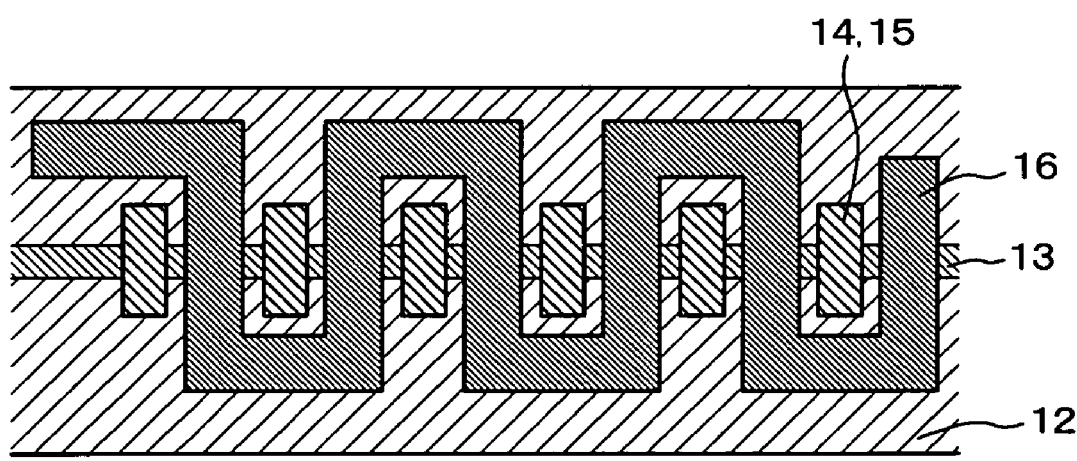

FIGS. 1A and 1B are views showing a constitution of an optical functional waveguide of a first embodiment of the present invention. FIG. 1A is a sectional view and FIG. 1B is a top view. The optical functional waveguide of the present embodiment includes: a substrate 11; a quartz waveguide clad 12; a quartz waveguide core 13; groove structures 14; a filling material 15; and a heater electrode 16. The optical functional waveguide serves as a phase modulation portion for optical modulators. The filling material 15 placed in the groove structures 14 is a transparent material in a wavelength region of guided light and is made of a different material or a material having a different composition from the quartz waveguide core 13. PMMA (polymethyl methacrylate), polyimide, epoxy resin, silicon resin or the like is applicable to the filling material 15. Alternatively, an organic material is applicable that hydrogen of these materials is substituted with fluorine. The refractive index temperature coefficients of these materials are generally about 10 to 100 times that of quartz. Because a refractive index temperature coefficient of quartz, $1.1 \times 10^{-5}$ [1/° C.], is low, a waveguide length (heater length) of about 970μ is required even if a temperature change of 50° C. is allowed in order to cause a phase change of $\pi$ in a communication wavelength of 1.55μ band. When the refractive index temperature coefficient of a material placed in the groove structures 14 is assumed to be fifty times that of quartz and the temperature change is 10° C., the length of a groove formation portion may be 184.3μ. For example, when the effective refractive index of the waveguide is 1.45, the average of groove widths is 9.7μ, the average of groove intervals is 9.7μ, the number of grooves is 10, and the refractive index variation is $\pm 2.75 \times 10^{-3}$, loss caused by outward reflection from the waveguide on each surface is only 0.00008 dB, and can thereby be disregarded. Loss caused by coupling to a radiation mode on an interface is about 0.5 dB. The heater electrode 16 is interposed between the groove structures 14 provided along an optical path in an alternating S-shaped arrangement so that the temperature of the filling material 15 can be quickly and sharply varied with small energy. The groove width of an optical propagation direction of the groove structure 14 is generally set to about 3 to 20μ. However, the groove width is required to be narrowed so that the loss can be reduced. The interval between the groove structures 14 is set to about 3 to 20μ. It is desirable for the groove width and groove interval to be randomly varied so that a minute resonance structure cannot be easily formed.

Figure 2A:
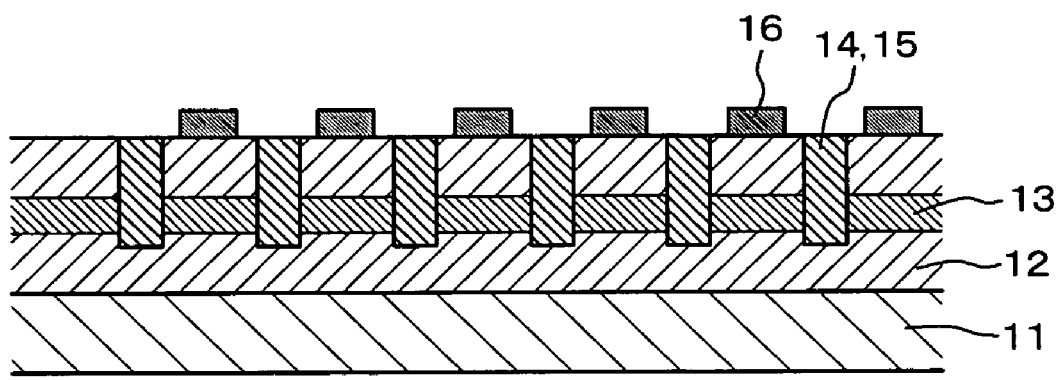
FIGS. 2A and 2B are views showing a constitution of an optical functional waveguide of a second embodiment of the present invention.
Figure 2B:
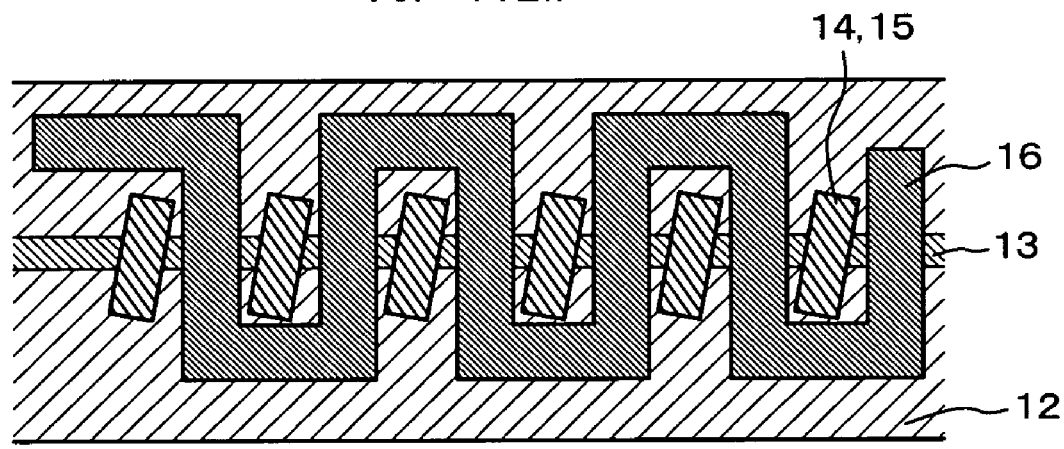

FIGS. 2A and 2B are views showing a constitution of an optical functional waveguide of a second embodiment of the present invention. FIG. 2A is a sectional view and FIG. 2B is a top view. In the optical functional waveguide of the present embodiment, the groove structure 14 is arranged so as to be tilted to a direction of the optical path formed with the quartz waveguide core 13 as viewed from the top. Thus, the amount of reflected light coupled to the waveguide from a groove interface can be controlled.

Figure 3A:
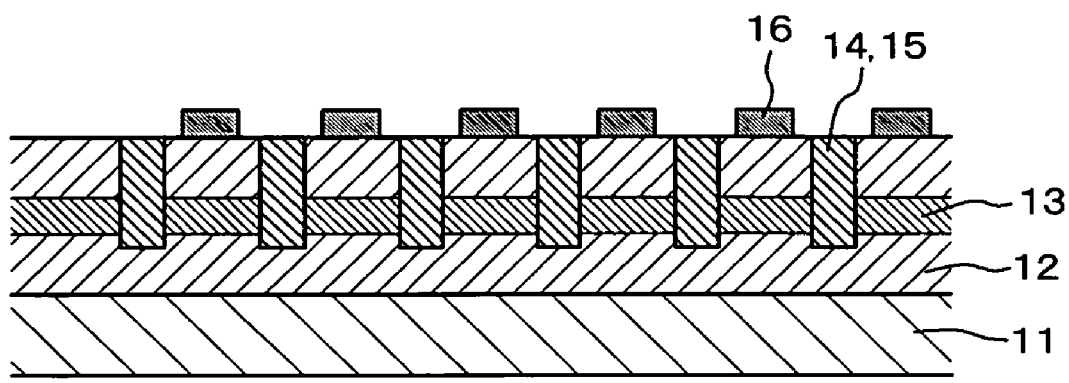
FIGS. 3A and 3B are views showing a constitution of an optical functional waveguide of a third embodiment of the present invention.
Figure 3B:
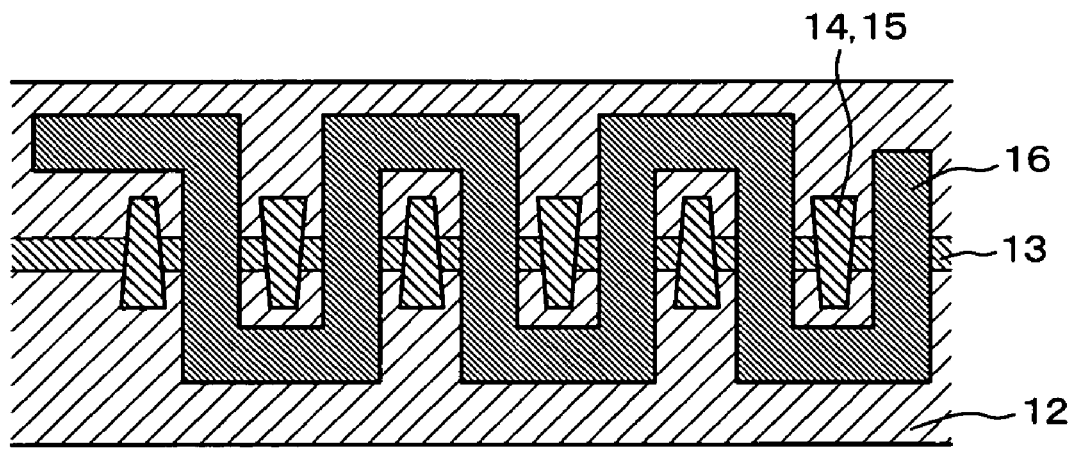

FIGS. 3A and 3B are views showing a constitution of an optical functional waveguide of a third embodiment of the present invention. FIG. 3A is a sectional view and FIG. 3B is a top view. In the optical functional waveguide of the present embodiment, the shape of the groove structure 14 is made trapezoidal as viewed from the top. Thus, the amount of reflected light coupled to the waveguide from the groove interface can be controlled as well.

Figure 4A:
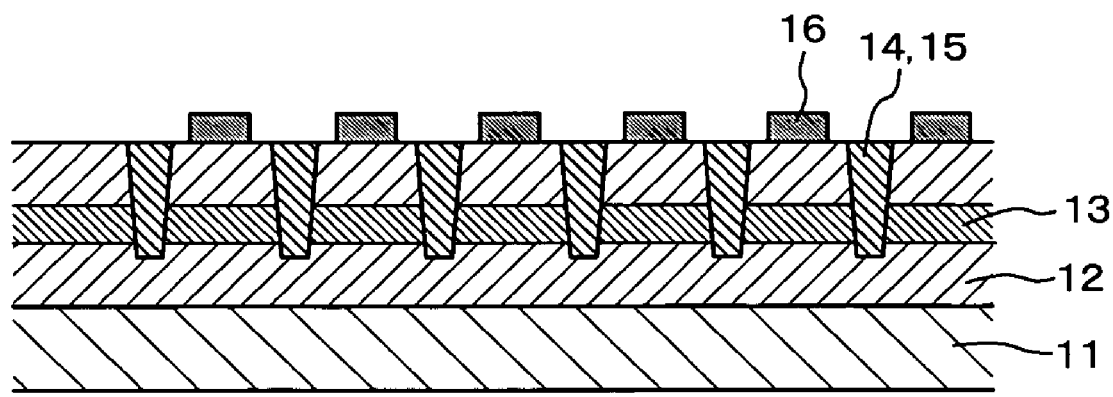
FIGS. 4A and 4B are views showing a constitution of an optical functional waveguide of a fourth embodiment of the present invention.
Figure 4B:
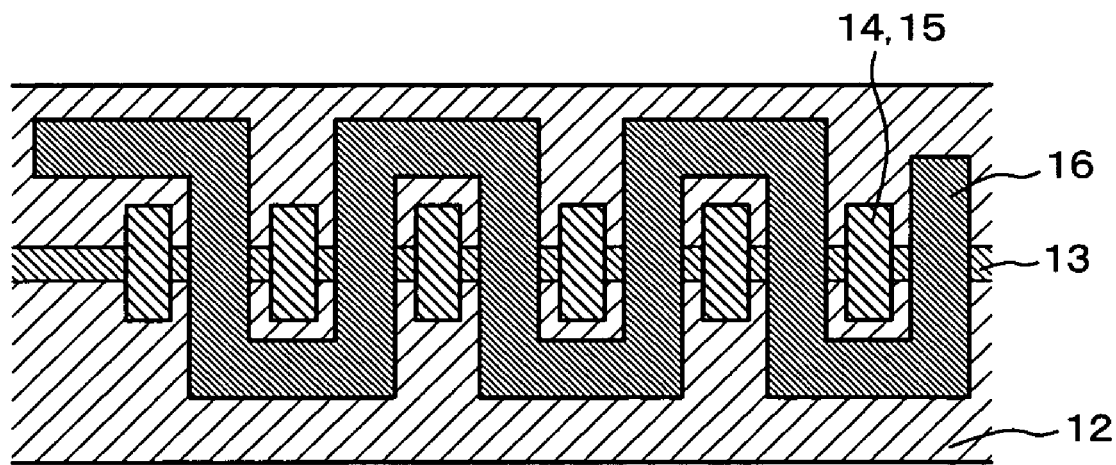

FIGS. 4A and 4B are views showing a constitution of an optical functional waveguide of a fourth embodiment of the present invention. FIG. 4A is a sectional view and FIG. 4B is a top view. In the optical functional waveguide of the present embodiment, the shape of the groove structure 14 is made trapezoidal as viewed from the side (that is, as a sectional view along the optical path is viewed). Thus, the amount of reflected light coupled to the waveguide from the groove interface can be controlled as well.

FIG. 5 is a top view showing a constitution of an optical functional waveguide of a fifth embodiment of the present invention. In the optical functional waveguide of the present embodiment, filling material injection ports 17 are provided so that the filling material 15 is injected into the groove structures 14 during manufacture. The heater electrode 16 can be successively arranged so as not to overlap with the groove structures 14 by such constitution that the filling material injection ports 17 are provided at both sides to the optical path respectively and the filling material 15 is injected from the both sides to the optical path in turn. Moreover, an upper surface of the groove structure 14 is not flat, and therefore it is difficult that the electrode 16 is arranged so as to overlap with the groove structure 14.

Figure 6:
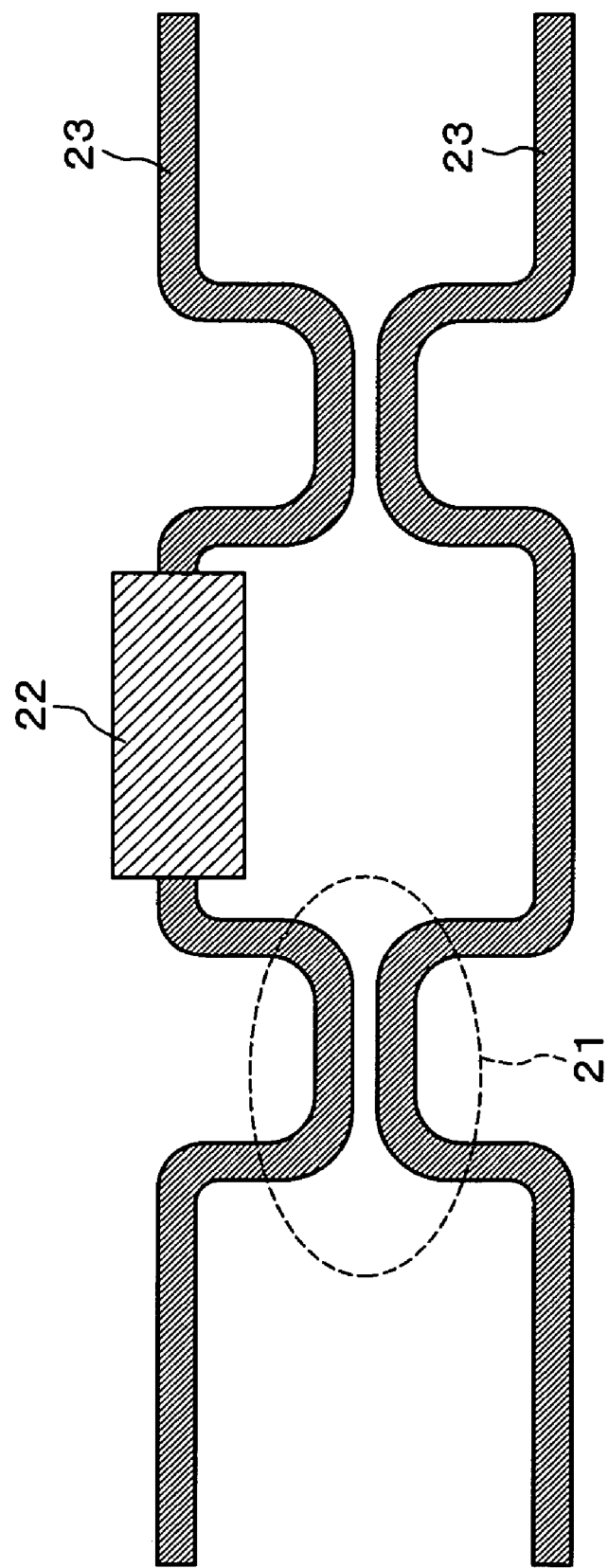
FIG. 6 is a view showing a constitution of an optical modulator of a sixth embodiment of the present invention.

FIG. 6 is a view showing a constitution of an optical modulator of a sixth embodiment of the present invention. The optical modulator of the present embodiment is a Mach-Zehnder interferometer type modulator, and includes a directional coupler portion 21, a phase modulation portion 22 and an optical waveguide 23. The optical functional waveguides of the first to fifth embodiments are used for the phase modulation portion 22. The temperature change becomes ⅕ (=10° C./50° C.), so the switching time is shortened to one several times. The heating portion length becomes about ⅕ (≈184.3μ/970μ), and therefore power consumption is reduced to ½₀ or less.

FIG. 7 is a view showing a constitution of an optical modulator of a seventh embodiment of the present invention. The optical modulator of the present embodiment is another Mach-Zehnder interferometer type modulator, and includes the phase modulation portion 22, the optical waveguide 23 and a Y branch 24. The optical functional waveguides of the first to fifth embodiments are used for the phase modulation portion 22. The present embodiment provides the same effect as the sixth embodiment.

Figure 8A:
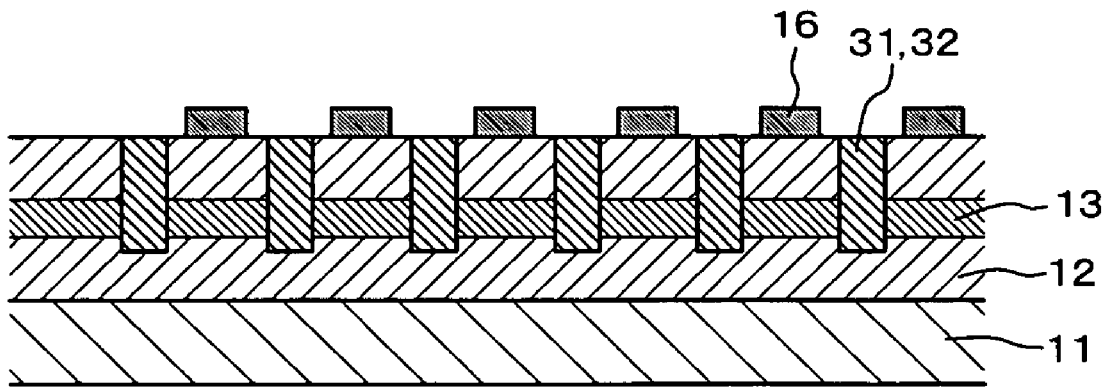
FIGS. 8A and 8B are views showing a constitution of an optical functional waveguide of an eighth embodiment of the present invention.
Figure 8B:
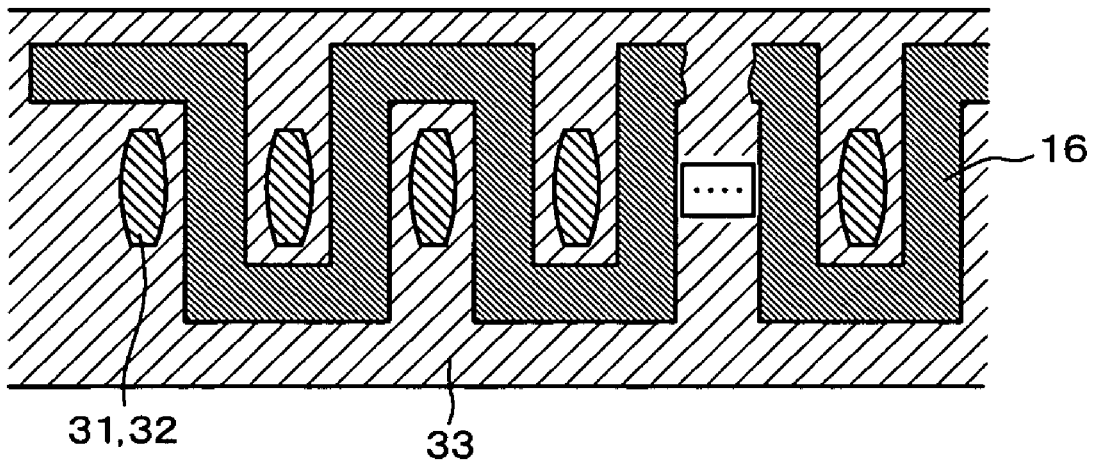

FIGS. 8A and 8B are views showing a constitution of an optical functional waveguide of an eighth embodiment of the present invention. FIG. 8A is a sectional view and FIG. 8B is a top plan view. The optical functional waveguide of the present embodiment includes: the substrate 11; the quartz waveguide clad 12; the quartz waveguide core 13; the heater electrode 16; groove structures 31; a filling material 32; and a quartz slab waveguide 33 constituted by the quartz waveguide clad 12 and the quartz waveguide core 13. The optical functional waveguide is not a single mode waveguide and serves as a phase modulation portion for optical modulators. The temperature of the substrate 11 is controlled and the refractive index of the filling material 32 is controlled. Each refractive index of the quartz waveguide clad 12 and the quartz waveguide core 13 varies, but the variation is so small compared to that of the filling material 32 that it can be disregarded. When the effective refractive index of the quartz slab waveguide 33 and the refractive index of the filling material 32 are the same at a certain temperature, light propagating through the quartz slab waveguide 33 is hardly affected. However, the refractive index of the filling material 32 relatively increases or decreases as the temperature rises or lowers, and thus the propagating light is subjected to convex lens operation or concave lens operation. As a matter of course, when the refractive index temperature coefficient of the filling material 32 is negative, the propagating light is subjected to concave lens operation or convex lens operation, respectively. Further, the focal length of the lens can be controlled by the temperature. Thus, a wavefront of the light propagating through the slab waveguide can be controlled by control of the temperature of the filling material. That is, a divergence angle of the propagating light can be controlled. The number of groove structures 31 are increased or decreased so that a control range can be designed. Especially, when reflected light or a resonance characteristic is required to be avoided, it is required that a boundary surface is tilted to an optical axis similar to the second to fourth embodiment. Thus, the reflected light or the resonance characteristic can be avoided to a considerable extent. However, in the present embodiment, because the boundary surface of the top view is a curve, effects cannot be obtained even if the boundary surface is tilted. Therefore, a line indicating the boundary surface in the sectional view is tilted.

Figure 9A:
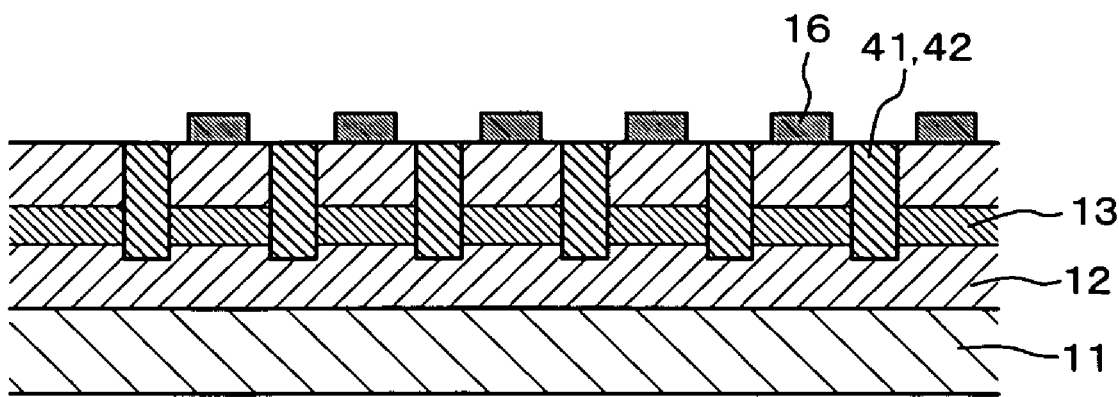
FIGS. 9A and 9B are views showing a constitution of an optical functional waveguide of a ninth embodiment of the present invention.
Figure 9B:
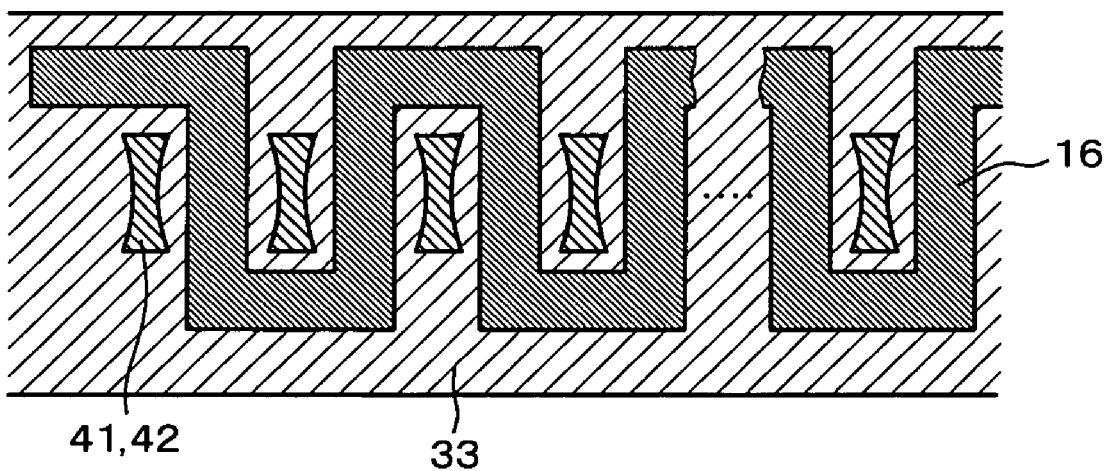

FIGS. 9A and 9B are views showing a constitution of an optical functional waveguide of a ninth embodiment of the present invention. FIG. 9A is a sectional view and FIG. 9B is a top plan view. The optical functional waveguide of the present embodiment includes: the substrate 11; the quartz waveguide clad 12; the quartz waveguide core 13; the heater electrode 16; groove structures 41; a filling material 42; and a quartz slab waveguide 33 constituted by the quartz waveguide clad 12 and the quartz waveguide core 13. In the present embodiment, the shape of the groove structure 41 is made a concave lens-shape. Changes of lens operation or focal length to the temperature of this concave lens-shape becomes reversed to that of a convex lens-shape.

As a matter of course, a plano-convex lens type, plano-concave lens type, a meniscus lens type or the like, further-more a spherical lens type or aspherical lens of these is applicable and also a lens type combining a spherical surface with an aspherical surface is applicable in some cases. Alternatively, as a matter of course, any of these lens types may be combined with each other.

Figure 10:
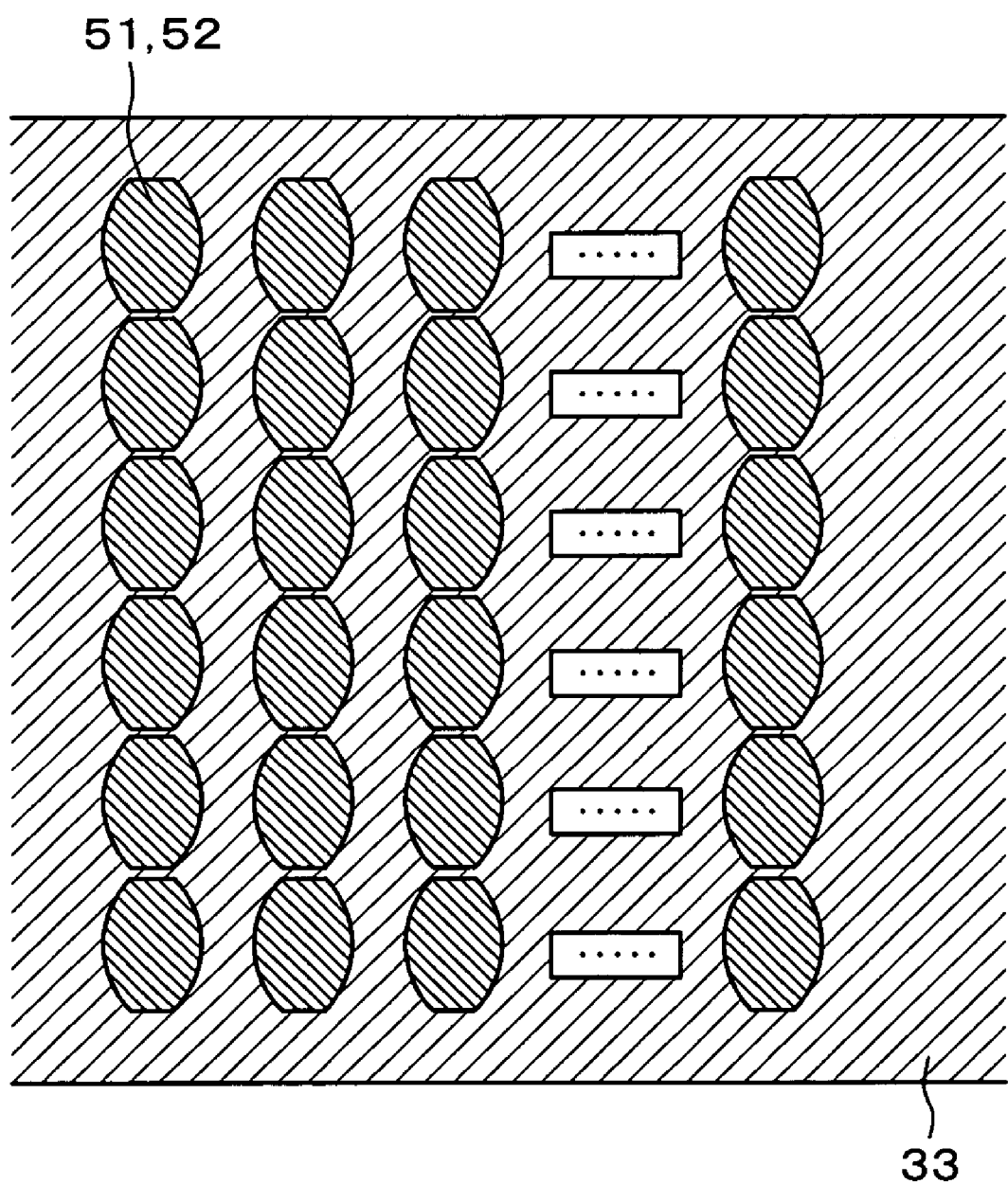
FIG. 10 is a top view showing a constitution of an optical functional waveguide of a tenth embodiment of the present invention.

FIG. 10 is a top view showing a constitution of an optical functional waveguide of a tenth embodiment of the present invention. In the optical functional waveguide of the present embodiment, groove structures 51 and a filling material 52 are arranged in two-dimension parallel in the quartz slab waveguide 33. The heater electrode is not shown in FIG. 10.

Figure 11:
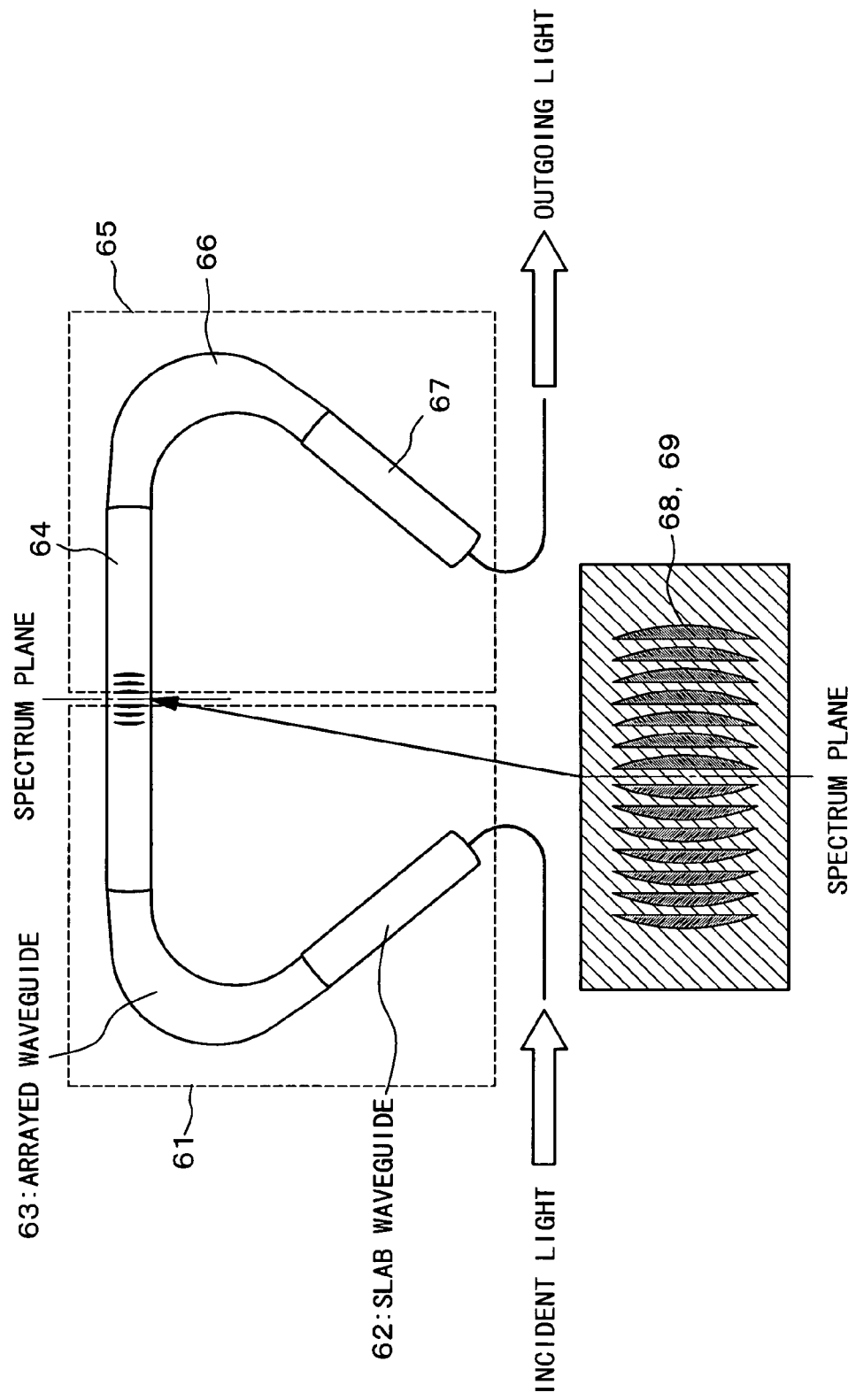
FIG. 11 is a top view showing a constitution of a dispersion compensation circuit of an eleventh embodiment of the present invention.

FIG. 11 is a top view showing a constitution of a dispersion compensation circuit of an eleventh embodiment of the present invention. The dispersion compensation circuit of the present embodiment includes a first arrayed waveguide grating 61 and a second arrayed waveguide grating 65, more concretely, it includes: a slab waveguide 62; arrayed waveguides 63; a slab waveguide 64; arrayed waveguides 66; a slab waveguide 67; groove structures 68; and a filling material 69. Here, the plano-convex lens-shaped groove structures 68 are arranged in the vicinity of a spectrum plane. Light made incident into the first arrayed waveguide grating 61 is divided onto the spectrum plane. When the spectrum plane just becomes a flat plane, the dispersion value of the dispersion compensation circuit becomes zero. The dispersion value can be set to a predetermined value by change of the shape and number of the groove structure 68. Further, the dispersion amount can be made variable by control of the whole substrate temperature. As a matter of course, only the groove structures 68 may be locally heated so that the dispersion amount can be controlled. The dispersion amount capable of being set is varied by design parameters of the first and second arrayed waveguide gratings 61 and 65. However, the dispersion amount is determined by a condition that time window widths corresponding to differences between the minimum light path lengths and the maximum light path lengths in the arrayed waveguides 63 and 66 are larger than the rise time widths and fall time widths of an incident light pulse and an outgoing light pulse respectively, and free spectral ranges of the first and second arrayed waveguide gratings 61 and 65 are larger than the spectrum width of the optical signal.

Figure 12:
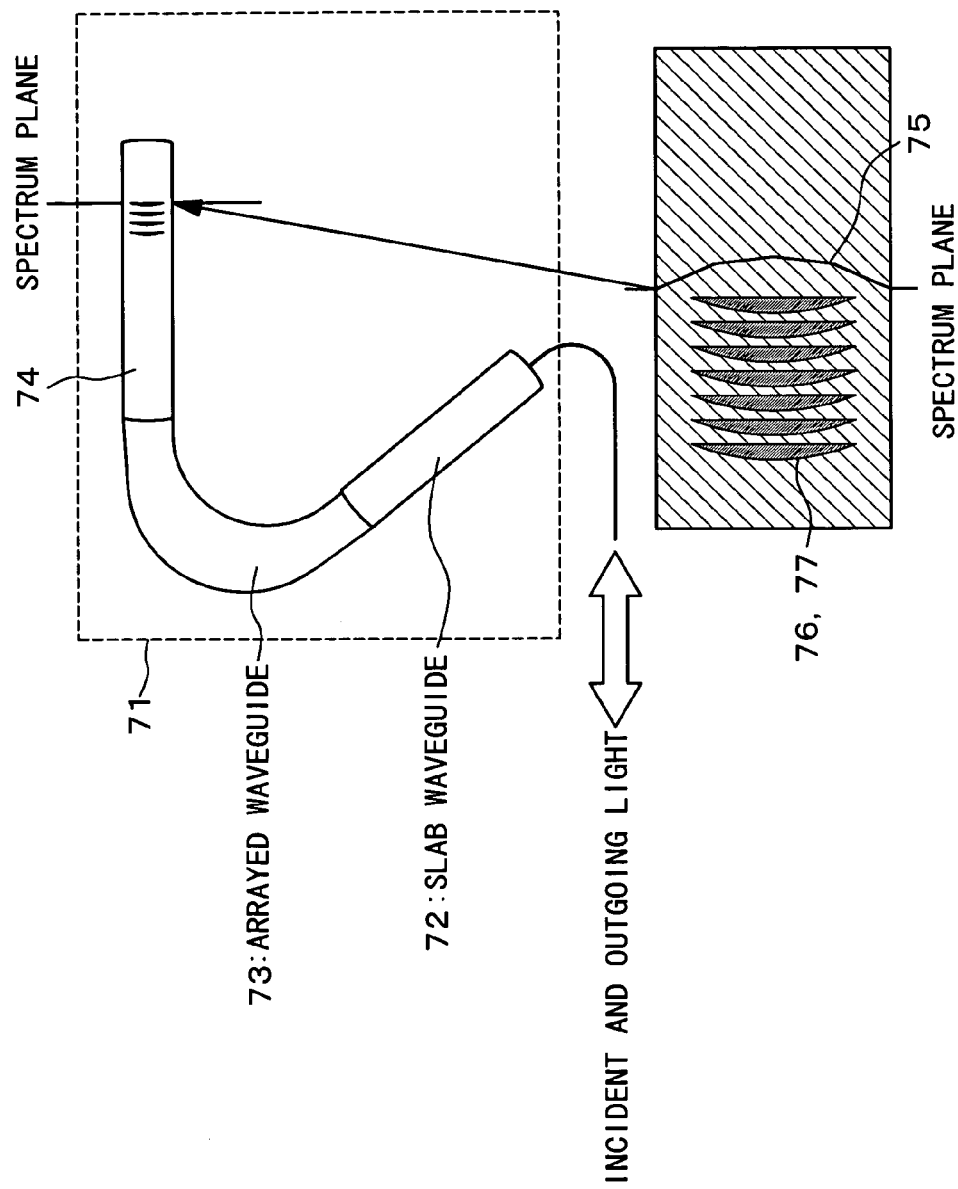
FIG. 12 is a top view showing a constitution of a dispersion compensation circuit of a twelfth embodiment of the present invention.

FIG. 12 is a top view showing a constitution of a dispersion compensation circuit of a twelfth embodiment of the present invention. The dispersion compensation circuit of the present embodiment obtains the same characteristic as the eleventh embodiment with a reflection type constitution and includes an arrayed waveguide grating 71, more concretely, it includes: a slab waveguide 72; arrayed waveguides 73; a slab waveguide 74; a mirror 75; groove structures 76; and a filling material 77. The shape of the mirror 75 may be linear, but a circular mirror is generally employed which has a curvature suitable for control of a dispersion value when the temperature does not vary. Loss in the present embodiment is larger than that of the eleventh embodiment, but the device size is miniaturized and an initial dispersion value can be set by the mirror curvature.

Figure 13:
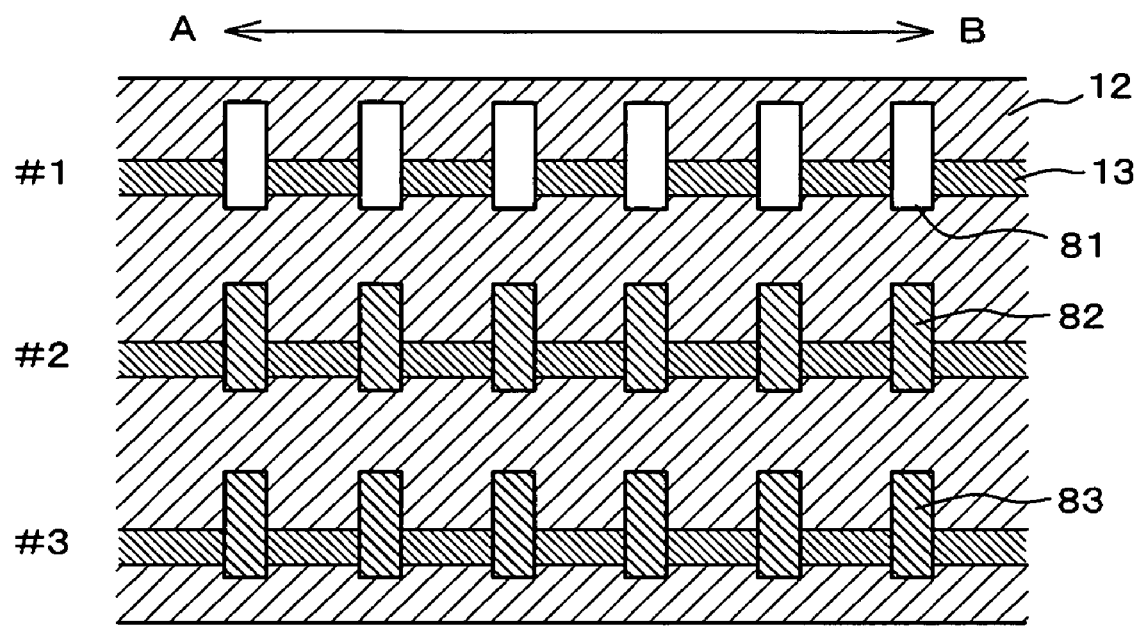
FIG. 13 is a top view showing a constitution of an optical functional waveguide of a thirteenth embodiment of the present invention.

FIG. 13 is a top view showing a constitution of an optical functional waveguide of a thirteenth embodiment of the present invention. The optical functional waveguide of the present embodiment includes: the quartz waveguide clad 12; the quartz waveguide core 13; first groove structures 81; second groove structures 82; and third groove structures 83. The geometrical lengths of waveguides (#1 to #3) are equal to each other in A-B. However, each optical length (optical path length) depends on the effective refractive index. In the present embodiment, the first, second and third groove structures 81, 82 and 83 respectively provided in the waveguide (#1 to #3) are filled with materials having refractive indexes different from each other respectively so that each optical path length corresponding to A-B can be finely adjusted. When A-B is too long, the geometrical lengths are equal to each other but the optical lengths might be different from each other owing to non-uniformity of a waveguide manufacturing process. In the constitution of the present embodiment, such fluctuation is measured and the refractive indexes of the materials respectively placed in the first, second and third groove structures 81, 82 and 83 are controlled so that the measured fluctuation can be compensated. Alternatively, waveguides of adjacent arrays are required to have optical path lengths different from each other at a common difference in the arrayed waveguide grating, but the optical path length similarly departs from a desirable optical path length owing to the non-uniformity of the waveguide manufacturing process. In this case, similarly, the groove structures provided in each waveguide are filled with the material, of which refractive index is controlled, so that the optical path length difference can be fixed.

Figure 14:
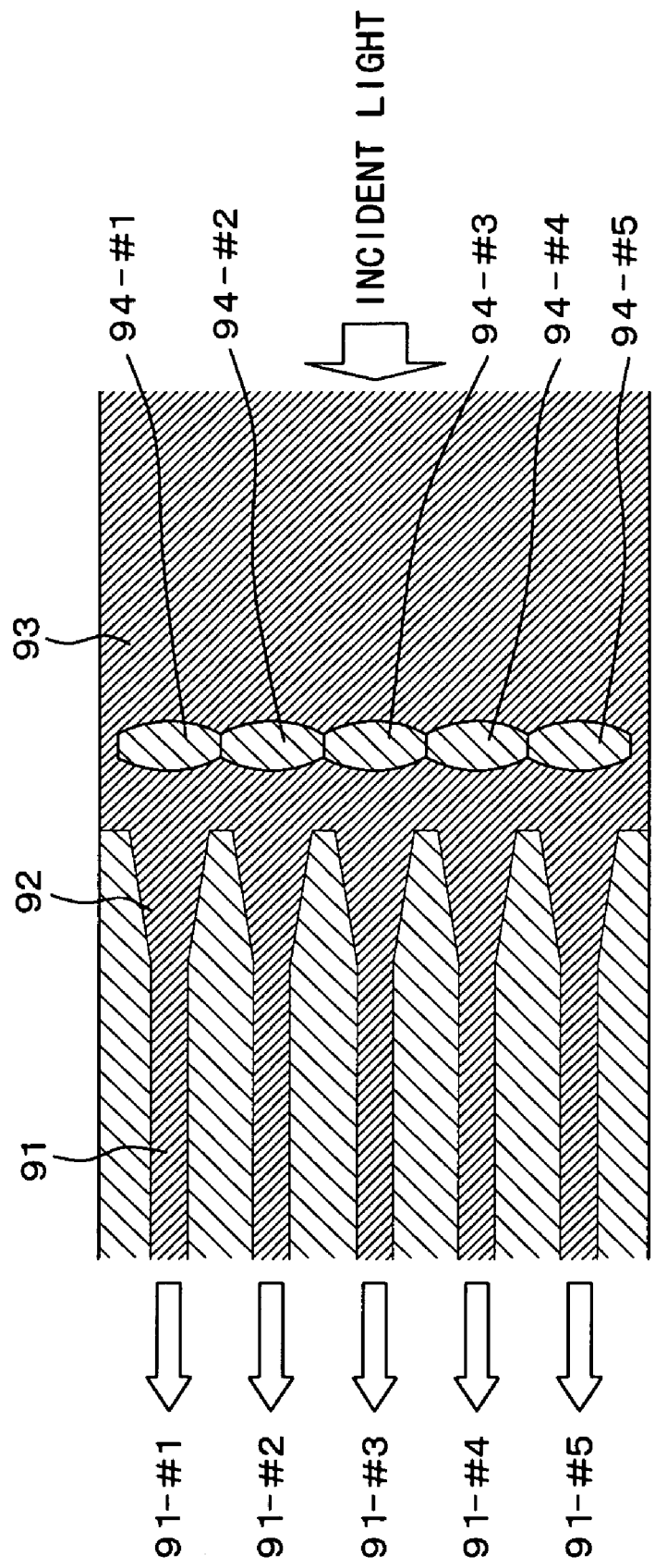
FIG. 14 is a top view showing a constitution of an optical functional waveguide of a fourteenth embodiment of the present invention.

FIG. 14 is a top view showing a constitution of an optical functional waveguide of a fourteenth embodiment of the present invention. The optical functional waveguide of the present embodiment includes: single mode waveguides 91; tapered waveguides 92; a slab waveguide 93; and lens-shaped groove structures 94, and it is coupling portions of a slab waveguide and arrayed single mode waveguides, the coupling portions being frequently used for multiplexing/demultiplexing circuits. The lens-shaped groove structures 94 are provided so that light made incident from the slab waveguide 93 side into a gap between the single mode waveguides 91 can be introduced into the single mode waveguide 91 with high efficiency and loss of the multiplexing/demultiplexing circuit can be reduced. Because amplitude of light made incident from a slab waveguide varies depending on places (the amplitude is large in a central portion and small in an end portion), each interval between the first to fifth single mode waveguides 91-#1 to #5 (central intervals are narrowed and end intervals are widened) is adjusted and sizes of the first to fifth groove structures 94-#1 to #5 are adjusted so as to correspond to the intervals respectively, so that coupling efficiency from the slab waveguide 93 to the first to fifth single mode waveguides 91-#1 to #5 can be made equal to each other.

Figure 15:
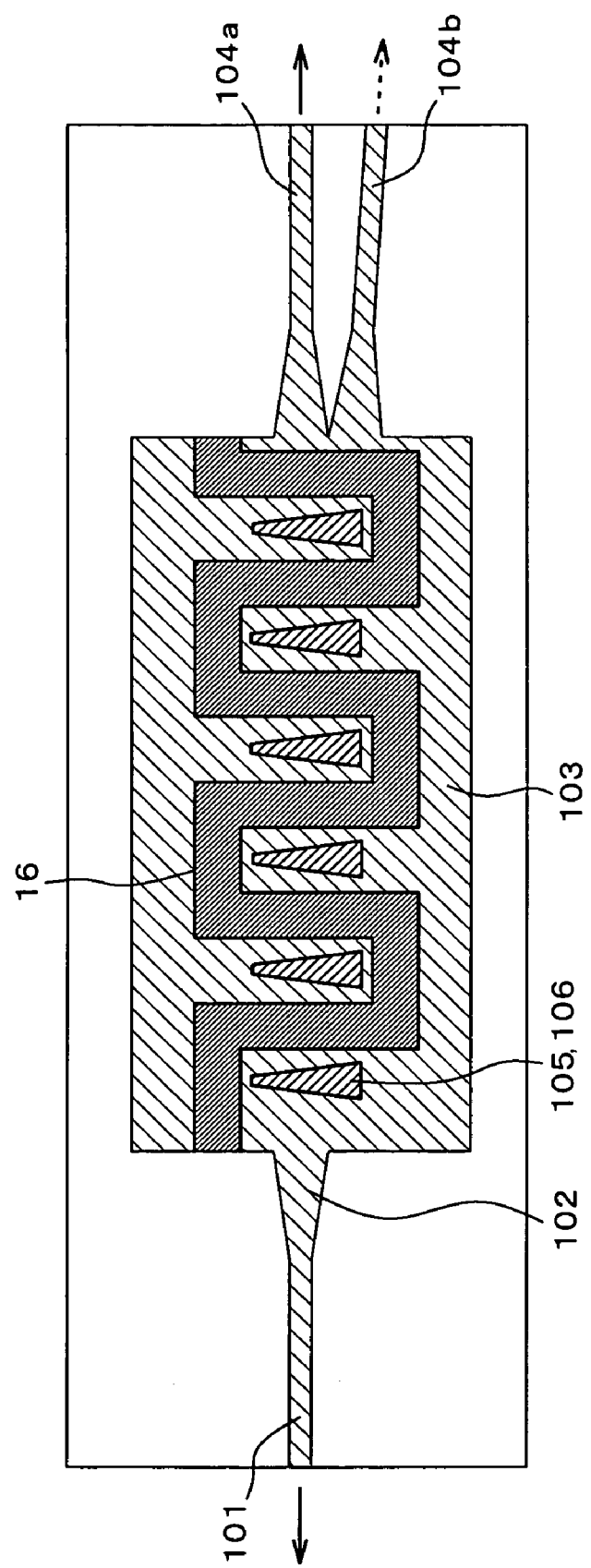
FIG. 15 is a top view showing a constitution of an optical functional waveguide of a fifteenth embodiment of the present invention.

FIG. 15 is a top view showing a constitution of an optical functional waveguide of a fifteenth embodiment of the present invention. The optical functional waveguide of the present embodiment includes: the heater electrode 16; a single mode input waveguide 101; a tapered waveguide 102; a slab waveguide 103; a first single mode output waveguide 104a; a second single mode output waveguide 104b; wedge-shaped, that is, trapezoidal groove structures 105; and a filling material 106. The wedge-shaped groove structures 105 are arranged so that directions of wedge are the same. That is, the present embodiment provides a 1×2 optical switch. A guide direction of light is varied by temperature control of the filling material 106, and thus the optical switch is realized. The temperature control allows light made incident into the single mode input waveguide 101 to selectively output from the first single mode output waveguide 104a and the second single mode output waveguide 104b. As a matter of course, the number of output waveguides may be increased. When the output waveguide is kept away, an angular variation becomes very small so that a necessary temperature variation can be reduced. As a matter of course, a 2×2 switch to N×N switch can be constituted by combination of the 1×2 switches.

Moreover, the present invention is not limited to the embodiments as described above.

The publications, patents and patent applications cited herein are incorporated herein by reference in their entirety.

The invention claimed is:

1. An optical functional waveguide comprising:
   a substrate;
   a clad formed on said substrate;
   a core which is formed in said clad and serves as an optical path for propagating light;
   a plurality of lens-shaped groove structures formed so as to align at a predetermined interval along the optical path and fragmentize the optical path and being filled with a material having a refractive index temperature coefficient different from that of said core; and
   a heater electrode interposed between said plurality of lens-shaped groove structures provided along the optical path for controlling a temperature of said material and a divergence angle of the propagating light.

2. An optical functional waveguide according to claim 1, wherein at least one of the end faces of said plurality of lens-shaped groove structures is tilted from a position perpendicular to the optical path.

3. An optical modulator comprising the optical functional waveguide according to claim 1 and modulating amplitude or phase of light.

4. An arrayed waveguide grating comprising the optical functional waveguide according to claim 1 in a slab waveguide.

5. A dispersion compensation circuit comprising the optical functional waveguide according to claim 1 in the vicinity of a coupling portion that two arrayed waveguide gratings are coupled to each other in a cascade.

6. A dispersion compensation circuit comprising:
   a mirror provided in a waveguide and arranged in the vicinity of a spectrum plane; and
   the optical functional waveguide according to claim 1 arranged in the vicinity of said mirror.

7. An optical functional waveguide according to claim 1, wherein said lens-shaped groove structure is provided at a slab waveguide side of a coupling portion of the slab waveguide and a single mode waveguide.

8. An optical functional waveguide comprising:
   a substrate;
   a clad formed on said substrate;
   a core which is formed in said clad and serves as an optical path;
   a plurality of wedge-shaped groove structures formed so as to align at a predetermined interval along the optical path and fragmentize the optical path and being filled with a material having a refractive index temperature coefficient different from that of said core; and
   a heater electrode means interposed between said plurality of wedge-shaped groove structures provided along the optical path for controlling a temperature of said material and a guide direction of light.

* * * * *